United States Patent
Vandenhende et al.

(10) Patent No.: US 7,135,546 B1
(45) Date of Patent: Nov. 14, 2006

(54) METHOD FOR RECYCLING VINYL POLYMER-BASED ARTICLES

(75) Inventors: Bernard Vandenhende, Leest (BE); Jean-Marie Yernaux, Rixensart (BE)

(73) Assignee: Solvay (Societe Anonyme), Brussels (BE)

( * ) Notice: Subject to any disclaimer, the term of this patent is extended or adjusted under 35 U.S.C. 154(b) by 875 days.

(21) Appl. No.: 10/088,085

(22) PCT Filed: Sep. 18, 2000

(86) PCT No.: PCT/EP00/09150

§ 371 (c)(1),
(2), (4) Date: Jun. 5, 2002

(87) PCT Pub. No.: WO01/23463

PCT Pub. Date: Apr. 5, 2001

(30) Foreign Application Priority Data

Sep. 24, 1999  (FR)  .................................. 99 12036

(51) Int. Cl.
*C08F 6/00* (2006.01)
(52) U.S. Cl. ........................ 528/500; 521/46.5; 521/48; 526/344; 526/344.5
(58) Field of Classification Search ............... 521/46.5, 521/48; 526/344, 344.3; 528/500
See application file for complete search history.

(56) References Cited

U.S. PATENT DOCUMENTS 3,475,218 A   10/1969   Torrenzano et al.
3,836,486 A * 9/1974   Hafner ...................... 521/46.5

FOREIGN PATENT DOCUMENTS

CA   617 788    4/1961
EP   0 945 481  9/1999

OTHER PUBLICATIONS

U.S. Appl. No. 10/497,995, filed Jun. 8, 2004, Vandenhende et al.
U.S. Appl. No. 10/088,085, filed Jun. 5, 2002, Vandenhende et al.

* cited by examiner

*Primary Examiner*—Terressa Boykin
(74) *Attorney, Agent, or Firm*—Oblon, Spivak, McClelland, Maier & Neustadt, P.C.

(57) ABSTRACT

Process for recycling an article based on at least one vinyl chloride or vinylidene chloride polymer, according to which:
(a) the article is cut up into fragments with a mean size of 1 cm to 50 cm in the case where it would exceed these sizes;
(b) the article fragments are brought into contact with an azeotropic or quasiazeotropic mixture of water and of a solvent capable of dissolving the polymer, at a temperature of at least 120° C.;
(c) the polymer dissolved in the solvent is precipitated by a reduction in pressure and by injection of steam into the solution thus obtained, which additionally results in the entrainment of the solvent-water azeotrope and thus leaves a mixture remaining which is essentially composed of water and of solid polymer particles;
(d) the polymer particles are collected.

21 Claims, 1 Drawing Sheet

METHOD FOR RECYCLING VINYL POLYMER-BASED ARTICLES

This application is a 371 of PCT/EP00/09150 filed Sep. 18, 2000, and claims priority to French patent application 99/12036 filed Sep. 24, 1999.

The present invention relates to a process for the recycling of articles based on vinyl polymers, such as vinyl chloride and vinylidene chloride polymers.

These polymers are widely used in the manufacture of varied flexible or rigid articles, such as, for example, tarpaulins, coated fabrics and other components for the interior trim of vehicles, pipes, window frames or electrical cables possessing polymeric insulation.

Intensive grinding of these articles would generally result in a mixture of fine particles with a heterogeneous composition, the purification and the reuse of which would be difficult. In addition, in the case of articles reinforced with fibres (for example polyester fibres), the fibres often form a kind of wadding which greatly complicates the reuse of the ground materials.

Various processes based on dissolution by means of organic solvents have already been provided; however, they often present problems of safety and of pollution. In addition, they do not always make it possible to collect plastics with a sufficient purity to make possible an economically advantageous reuse thereof. Another disadvantage of these methods is that they generally result in an extraction of the additives (e.g. plasticizers) present in the vinyl polymers, which goes against a direct reuse of the latter. Finally, these known processes result in very fine polymer particles (of the order of a micron) being obtained, which particles are difficult to filter and to reprocess.

Consequently, the present invention is targeted at providing a recycling process which is simple, economic, safe and not very polluting and which makes it possible to collect plastics with a high purity and advantageous morphology while substantially preventing the possible additives being extracted therefrom.

More specifically, the present invention relates to a process for recycling an article based on at least one vinyl chloride or vinylidene chloride polymer, according to which:

(a) the article is cut up into fragments with a mean size of 1 cm to 50 cm in the case where it would exceed these sizes;
(b) the article fragments are brought into contact with an azeotropic or quasiazeotropic mixture of water and of a solvent capable of dissolving the polymer, at a temperature of at least 120° C.;
(c) the polymer dissolved in the solvent is precipitated by a reduction in pressure and by injection of steam into the solution thus obtained, which additionally results in the entrainment of the solvent-water azeotrope and thus leaves a mixture remaining which is essentially composed of water and of solid polymer particles;
(d) the polymer particles are collected.

The articles in question can be of any nature, provided that they are essentially composed of one or more vinyl chloride or vinylidene chloride polymers ("VC polymers"). The term "VC polymer" is understood to denote any homo- or copolymer comprising at least 50% by weight of vinyl chloride and/or of vinylidene chloride. Use is generally made of poly(vinyl chloride) (PVC) or poly(vinylidene chloride) (PVDC), that is to say a homopolymer. In addition to one or more VC polymers, the articles can also comprise one or more conventional additives, such as, for example, plasticizers, stabilizers, antioxidants, flame-retardant agents, pigments, fillers, and the like, including reinforcing fibres, for example glass fibres or fibres of an appropriate plastic, such as a polyester.

The articles can be provided in any form, for example in the form of flexible or rigid pipes, containers, sheets for covering floors, tarpaulins, window frames, insulating sheaths for electrical cables, and the like. They may have been manufactured by any known technique: extrusion, coating, injection moulding and the like.

The articles do not necessarily have to be provided in the form of objects exhibiting a well defined shape; the process also applies to articles in the liquid or pasty state, in particular to sludges collected during the cleaning of plants used for the manufacture of articles from vinyl plastisols. In addition to one or more vinyl chloride polymers, these articles in the liquid or pasty state can also comprise one or more solvents, for example white spirit.

The possible reinforcing fibres can be of any nature, natural or synthetic; use may in particular be made of glass fibres, cellulose fibres or plastic fibres. They are often plastic fibres and in particular polyester fibres. Poly(ethylene terephthalate) (PET) gives good results, in particular in the reinforcing of sheets used as tarpaulins. The diameter of the fibres is usually of the order of 10 to 100 μm. In the reinforced sheets, they are often long fibres, the length of which can reach several meters. However, they can also be shorter fibres, from a few millimeters to a few centimeters in length, optionally forming a woven fabric, a nonwoven fabric or a felt. By way of illustration, the fibres can represent from 1 to 40% of the weight of a reinforced sheet.

The first stage (a) of the process according to the invention consists, if necessary, in cutting up the articles so as to reduce them to fragments with a reduced size which are easy to handle. The mean size of these fragments is preferably at least 2 cm. Furthermore, it is advantageously at most 30 cm. This operation in which the articles are cut up can be carried out by means of any appropriate device, for example by means of grinders with rotating blades or with shears. It is clear that, if the article is already provided in the form of fragments with appropriate sizes, the stage in which the article is cut up is superfluous. In some cases, it may be of use to subject the article fragments thus obtained to an intermediate separation stage which makes it possible to remove by conventional techniques, such as flotation or electrostatic separation, possible constituents other than vinyl chloride or vinylidene chloride polymers.

The article fragments thus obtained are subsequently subjected to the action of a solvent exhibiting several specific characteristics. This operation can be carried out in any appropriate device, taking into account in particular the safety and environmental requirements, for example in a closed reactor exhibiting sufficient chemical resistance. The reaction mixture is preferably stirred. For the purpose of preventing the possible fibres from attaching to the stirring means and from disrupting their operation, an advantageous alternative form consists in carrying out the dissolution in a container in which is positioned a perforated rotary drum rotating at a moderate speed (preferably at less than 100 rev/min). The axis of the drum is preferably approximately horizontal. In the case where the article is reinforced with fibres, an additional advantage of such a device is that, after having extracted most of the solvent from this container, it is possible to rotate the drum at high speed, so as to "spin dry" the fibres which it comprises. The container(s) in which the dissolution and the precipitation are carried out will be described as reactor(s) below.

The solvent used is a substance—or a mixture of substances—capable of dissolving the vinyl chloride or vinylidene chloride polymer or polymers which the treated article comprises. In the case where the article is reinforced with fibres, the solvent must not bring about the dissolution of the reinforcing fibres. Surprisingly, it has been found that it is not essential to restrict the content of water in the solvent to very low values, provided that a sufficient dissolution temperature is used. It is therefore unnecessary to subject the articles to be treated to intensive drying or to provide stages targeted at greatly reducing the content of water in the solvent. For example, if methyl ethyl ketone (MEK) is used as solvent, a temperature of 1050 corresponds to an MEK-water azeotrope comprising 15% of water, which constitutes a high content. The disappearance of these constraints is extremely advantageous industrially and economically, given that the drying of the articles can consume considerable energy and that the separation of the water present in the solvent (e.g. in methyl ethyl ketone (MEK)) is a complex operation which requires at least one additional reactor, indeed even a distillation column.

It is necessary, in the context of the process according to the invention, for the solvent used to be miscible with water and to form an azeotrope with water. The solvent is advantageously chosen from methyl ethyl ketone (MEK), methyl isobutyl ketone and tetrahydrofuran. It is preferable to use MEK, which forms an azeotrope with water comprising (at atmospheric pressure) 11% of water and 89% of MEK (by weight).

The fact that an azeotropic or quasiazeotropic mixture of water and of solvent is used for the dissolution constitutes, as will be seen below, a considerable simplification, in so far as such a mixture can easily be recovered at the end of the process (for example by a simple separation by settling) and can thus be directly reused. The expression "azeotropic or quasiazeotropic mixture" is understood to indicate that the composition of the mixture is not necessarily precisely equal to the composition of the azeotrope but that a slight deviation (e.g. of less than 5%) is acceptable, so as to take into account, in particular, the variations in the azeotropic composition as a function of the pressure. This is because, as will be set out below, the final stages of the process are carried out at a pressure lower than that prevailing during the dissolution; this implies that the content of water in the water-solvent (azeotropic) mixture collected at the end of the process is somewhat lower than the content of water in the water-solvent azeotrope at the dissolution pressure.

The dissolution (stage b) is carried out under a pressure determined by the temperature. This pressure is generally at least 4 bar. The pressure advantageously does not exceed 10 bar.

In addition, it is advantageous to operate under an inert atmosphere, for example under nitrogen, in order to avoid any risk of explosion and of decomposition of the solvent.

The amount of solvent to be used must be chosen so as to prevent the increase in viscosity brought about by the dissolution of the polymer from disrupting the satisfactory progression of the process (filtration, and the like). It is preferable, during the dissolution stage (b), for the amount of article not to exceed 200 g per liter of solvent and in particular 100 g/l.

From the viewpoint of a reuse of the VC polymer thus collected, an advantageous alternative form of the process according to the invention consists in incorporating in the solvent, before or during the stage of dissolution of the polymer, one or more additives (stabilizers, plasticizers, and the like), the natures and the amounts of which are suited to the properties which it is desired to confer on the recycled polymer. It is desirable, in this case, for the additive or additives thus incorporated to be soluble in the solvent used. However, possible insoluble additives can be finely dispersed in the solvent.

On conclusion of the dissolution stage (b), there is available a mixture comprising, on the one hand, a liquid phase composed of the solvent in which the polymer is dissolved and, on the other hand, the possible undissolved constituents, for example reinforcing fibres. The separation of such constituents can be carried out, for example, by filtration using a cloth or screen, the openings of which exhibit sizes of the order of 0.1 to 10 mm. This separation must be carried out at a temperature which is sufficiently high to prevent any premature precipitation of the polymer; to this end, the temperature of the mixture is advantageously maintained at at least 75° C. during this separation.

In the cases where the article is reinforced with fibres, it is found that the fibres thus recovered are high in purity. In order to increase this purity, the fibres can optionally be subjected to a subsequent stage of centrifuging and/or of washing, for example using the same solvent, for the purpose of removing possible residual traces of polymer. The solvent which would have been used for this washing operation can advantageously be mixed with the fresh solvent used in the dissolution stage; the fact that it comprises traces of dissolved polymer is not detrimental to the effectiveness of the dissolution. The fibres can be reused directly in the manufacture of plastic-based reinforced articles.

In addition to possible fibres, this optional separation stage also makes it possible to collect possible "accessories", such as metal eyelets, labels, and the like, incorporated in the article and which would not have been removed therefrom before it was subjected to the process according to the invention. Likewise, possible pieces of metal conductors which would have remained in electrical cable sheaths can also be removed. If necessary, the solvent comprising the dissolved polymer can be filtered more finely for the purpose of removing therefrom possible dusts or other insoluble particles, for example by using a cloth or screen, the openings of which exhibit sizes of less than 200 μm, preferably less than 20 μn. As indicated above, this separation must also be carried out at a temperature which is sufficiently high to prevent any premature precipitation of the polymer.

Consequently, the present invention relates in particular to a process as described above in which, before precipitating the dissolved polymer, the possible undissolved constituents are removed at a temperature sufficient to prevent the precipitation of the polymer.

After having optionally separated the solid constituents, the dissolved polymer is precipitated (stage c) by reducing the pressure, which generally results in a decrease in the temperature. The reduction in pressure is carried out down to a pressure to which a temperature corresponds which is sufficiently low for the polymer to begin to precipitate, preferably down to atmospheric pressure. Furthermore, steam is injected, into the solvent comprising the dissolved polymer, in an amount sufficient to completely precipitate the dissolved polymer. A large excess of water (steam or liquid) with respect to the azeotropic composition is preferably added. For example, in the case of MEK, from 1 to 3 kg of water per kg of MEK are generally added. The reduction in pressure and the injection of steam precipitate the VC polymer in the form of solid particles (still substantially devoid of additives at this stage), the mean sizes of which are of the order of a micron.

Another effect of the injection of steam is to bring about the evaporation and the entrainment of the water-solvent azeotrope in the gaseous form out of the reactor comprising the solution. This azeotrope can subsequently be collected and condensed. The mixture which remains (which has not been evaporated) is essentially composed of water and of solid polymer particles. As long as the solution still comprises solvent, the temperature of the gas phase lying above the solution remains approximately equal to the boiling temperature of the azeotrope at the pressure used (by way of example, the evaporation temperature of the MEK-water azeotrope is approximately 73.5° C. at atmospheric pressure).

Advantageously, the precipitation of the polymer (stage c) is carried out by the joint injection of steam and of liquid water, which accelerates the precipitation of the polymer. It is not injurious for this water optionally to comprise a low concentration of solvent; this is advantageous in so far as, as set out below, a subsequent stage of the process specifically provides water with a slight charge of solvent, which can thus be reused without specific purification.

As soon as the concentration of solvent in the solution becomes sufficiently low, the additives dissolved in the solution deposit on the polymer particles, which; in a highly advantageous way promotes their agglomeration into grains (agglomerates) of the order of 500 μm, which will be very easy to filter, to handle and to reemploy subsequently (in contrast to particles of the order of a micron). Surprisingly, it has been found that these polymer grains (agglomerates) exhibit a highly satisfactory morphology and in particular a particle size which exhibits very little dispersion.

When virtually all the solvent has been entrained, the temperature of the gas phase—just like that of the liquid phase—approaches the boiling temperature of water (at the pressure used during the precipitation), which constitutes an easy means of detecting the virtually complete removal of the solvent.

Once the solution is substantially devoid of solvent, it is, however, advantageous to maintain a high temperature (for example by continuing the injection of steam) for at least a further 5 minutes and preferably for at least 10 minutes, which surprisingly has a highly favourable influence on the properties and the morphology of the polymer particles (agglomerates) (hardness, particle size, bulk density, porosity, and the like).

A very significant advantage of the removal of the solvent by means of steam is that most of the possible additives present in the treated polymer are not entrained with the solvent and are redeposited on the polymer particles. Consequently, the polymer particles collected on conclusion of the process still comprise a significant fraction of the additives which were initially present in the polymer (at least those of these additives which are soluble in the solvent; this generally does not affect the possible fillers, for example). This situation is particularly advantageous given that these additives are often expensive and that, in addition, the said particles can thus be reused directly in a process for the manufacture of articles based on this polymer. This reuse is facilitated by the fact that the particles thus recovered are pregelled, which simplifies the processing in comparison with the processing of a heterogeneous mixture of polymer granules and of additives added separately. Known processes for recycling by dissolution-precipitation do not exhibit this advantage, in view of the fact that they result in the extraction of the majority of the additives from the polymer.

An additional advantage of the injection of steam is that it generally renders superfluous external heating of the reactor in which the process takes place. This advantage is very important industrially: this is because external heating (via the wall of the reactor) would result in polymer encrustations on the wall of the said reactor (caking), requiring it to be frequently cleaned. In contrast, in the process of the invention, the injection of steam allows the wall to be at a lower temperature, which greatly reduces the risks of caking.

Another advantage of the process of the invention is that the possible emulsifiers which were present in the treated polymer pass into solution in the water and that the polymer particles collected on conclusion of the recycling are consequently substantially devoid of emulsifiers, which facilitates the use thereof; in particular, deposits on the processing plants are avoided, as well as the formation of bubbles at the surface of the novel products thus obtained.

The polymer particles (agglomerates) can then be easily collected (stage d), for example by filtration of the water-particles mixture, and optionally dried before being stored or reused. The residual water is advantageously purified in order to remove the dissolved constituents therefrom, such as emulsifiers or others.

Given the cost of the solvent and the disadvantages which its discharge into the environment might exhibit, it is desirable to recycle the solvent/water liquid fraction (richer in water than the azeotrope) collected on conclusion of the precipitation stage. A significant advantage of the process of the invention is that it is possible to recycle the liquid fraction in a very simple way and to completely reuse it. This is because a simple separation by settling makes it possible to separate the liquid fraction collected into:

on the one hand, an (upper) fraction with a (quasi)-azeotropic composition, that is to say predominantly of solvent, comprising approximately 10% of water (the exact content of water depends on the temperature and on the pressure), which can be reused in the dissolution stage;

on the other hand, a (lower) fraction predominantly of water (comprising, e.g., of the order of 80% of water), which can be reused in the form of liquid water and/or of steam (after reheating) in the precipitation stage (surprisingly and advantageously, the presence of a small proportion of solvent is not detrimental).

Despite these operations in which water is recycled, an additional contribution of water is generally necessary.

The process according to the invention can be carried out continuously or batchwise, the latter alternative form being preferred.

A major advantage of the said process is that it can operate in a closed loop, without polluting discharges being generated, given that both the solvent and the possible agent for separating the solvent-water mixture can be recycled and reused in the process.

DESCRIPTION OF THE FIGURE

The appended FIGURE diagrammatically illustrates in a non-limiting way, the progression of a specific alternative form of the process according to the invention, applied to the recycling of waste electrical cables insulated by a plasticized PVC sheath.

The symbols used have the following meanings:

Figure 1:
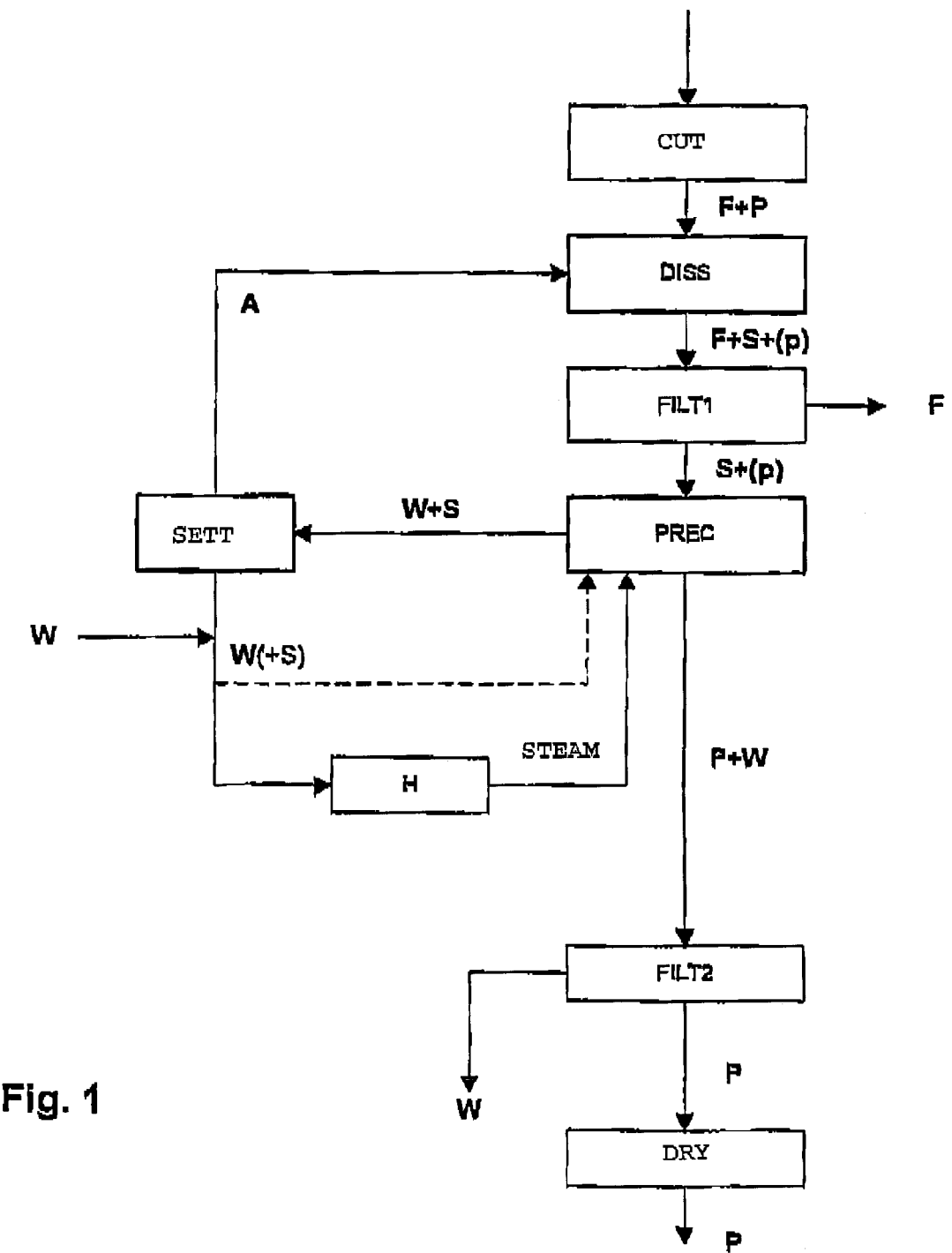

| | |
|---|---|
| P: | solid polymer |
| S: | solvent |
| (p): | dissolved polymer |
| W: | water |
| A: | solvent/water azeotrope |
| F: | possible insoluble constituents |
| STEAM: | steam (which can comprise a small proportion of solvent). |

The waste is first of all cut up (CUT) (stage a) and then the polymer which it comprises is dissolved (DISS) (stage b) under the effect of the solvent/water azeotropic mixture (A), in which may optionally have been dissolved certain additives which it is desired to incorporate in the polymer. The mixture thus obtained is then filtered (FILT1), which makes it possible to separate the possible insoluble constituents (F) (metal residues, and the like) from a solution of the polymer in the solvent (S+(p)). The polymer is then precipitated (PREC) (stage c) by injecting steam (STEAM) and optionally liquid water ("W(+S)") (which can comprise a small proportion of solvent) into the solution, which also results in the removal of the solvent-water azeotrope by entrainment. The solid polymer particles P (agglomerates) are separated by filtration (FILT2) (stage d) from the water W, which is advantageously purified before being discharged or reused, and then the particles are dried (DRY). The fraction W+S collected during the separation, which is richer in water than the azeotrope, is condensed (stage not shown) and then separated by settling (SETT), which provides on the one hand, a solvent/water azeotropic fraction (A), which can be reused in the dissolution stage, and, on the other hand, a fraction predominantly of water ("W(+S)"), which can, for example, be reused in the precipitation stage, in the form of steam (STEAM) after a heating stage (H), as well as optionally directly in the liquid form.

The invention claimed is:

1. A process for recycling an article comprising at least one of vinyl chloride polymer and vinylidene chloride polymer, according to which:
    (a) the article is cut up into fragments with a mean size of 1 cm to 50 cm in the case where it exceeds these sizes;
    (b) the fragments are brought into contact with an azeotropic or quasiazeotropic mixture of water and of a solvent capable of dissolving the polymer, at a temperature of at least 120° C. to dissolve the polymer in the solvent;
    (c) the polymer dissolved in the solvent is precipitated by a reduction in pressure and by injection of steam into the solution of polymer dissolved in the solvent, which additionally results in the entrainment of the solvent-water azeotrope and leaves a mixture remaining which is essentially composed of water and of solid polymer particles;
    (d) the polymer particles are collected.

2. The process according to claim 1, wherein stage (b) is carried out in a container in which is positioned a perforated rotary drum.

3. The process according to claim 1, wherein the solvent is chosen from the group consisting of methyl ethyl ketone (MEK), methyl isobutyl ketone, tetrahydrofuran and mixtures thereof.

4. The process according to claim 1, wherein stage (b) is carried out under a pressure of 4 to 10 bar.

5. The process according to claim 1, wherein during stage (b), the amount of article does not exceed 200 g per liter of solvent.

6. The process according to claim 1, wherein before precipitating the dissolved polymer, undissolved constituents are removed at a temperature sufficient to prevent the precipitation of the polymer.

7. The process according to claim 1, wherein the precipitation of the polymer in stage (c) is carried out by the joint injection of steam and of liquid water.

8. The process according to claim 1, wherein a solvent/water liquid fraction collected after conclusion of the precipitation in stage (c) is separated by settling into:
    a first fraction with an azeotropic or quasiazeotropic composition, which is reused in stage (b);
    a second fraction predominantly of water, which is reused in stage (c).

9. The process according to claim 1, wherein the article is a sheet.

10. The process according to claim 1, wherein said article comprises vinyl chloride polymer.

11. The process according to claim 2, wherein said article comprises vinyl chloride polymer.

12. The process according to claim 3, wherein said article comprises vinyl chloride polymer.

13. The process according to claim 4, wherein said article comprises vinyl chloride polymer.

14. The process according to claim 5, wherein said article comprises vinyl chloride polymer.

15. The process according to claim 7, wherein said article comprises vinyl chloride polymer.

16. The process according to claim 1, wherein said article comprises vinylidene chloride polymer.

17. The process according to claim 2, wherein said article comprises vinylidene chloride polymer.

18. The process according to claim 3, wherein said article comprises vinylidene chloride polymer.

19. The process according to claim 4, wherein said article comprises vinylidene chloride polymer.

20. The process according to claim 5, wherein said article comprises vinylidene chloride polymer.

21. The process according to claim 7, wherein said article comprises vinylidene chloride polymer.

* * * * *